United States Patent [19]

Kuzma

[11] 4,217,257

[45] Aug. 12, 1980

[54] ALKYD RESINS WITH USE OF MULTIFUNCTIONAL MONOMERS

[75] Inventor: Edward J. Kuzma, Woodbridge, N.J.

[73] Assignee: Celanese Corporation, New York, N.Y.

[21] Appl. No.: 10,200

[22] Filed: Feb. 8, 1979

Related U.S. Application Data

[63] Continuation of Ser. No. 832,774, Sep. 13, 1977, abandoned, which is a continuation of Ser. No. 660,738, Feb. 23, 1976, abandoned.

[51] Int. Cl.² .......................................... C09D 3/66
[52] U.S. Cl. ............................ 260/22 CB; 260/23 P
[58] Field of Search ...................... 260/22 CB, 23 P

[56] References Cited

U.S. PATENT DOCUMENTS

| | | | |
|---|---|---|---|
| 2,530,315 | 11/1950 | Rust et al. | 260/22 CB |
| 2,646,416 | 7/1953 | Parker | 260/22 CB |
| 3,734,872 | 5/1953 | Wakimoto et al. | 260/22 CB |
| 4,014,830 | 3/1977 | Rumfield | 260/22 CB |

FOREIGN PATENT DOCUMENTS 662525  5/1963  Canada ................................ 260/11 CB

*Primary Examiner*—Ronald W. Griffin
*Attorney, Agent, or Firm*—Linn I. Grim

[57] ABSTRACT

Improved process of preparing alkyd resins by incorporating α,β-ethylenically unsaturated acid esters of polyols into alkyd resin and alkyd resin products produced.

9 Claims, No Drawings

ALKYD RESINS WITH USE OF MULTIFUNCTIONAL MONOMERS

This is a continuation of application Ser. No. 832,774 filed on Sept. 13, 1977, now abandoned, which in turn is a continuation of application Ser. No. 660,738 filed on Feb. 23, 1976, now abandoned.

This invention relates to a method of preparing improved alkyd resins, and products produced thereby.

Alkyd resins are the products obtained by condensation of polybasic, i.e. polycarboxylic, acids with polyols, e.g. phthalic acid and glycerol. Modified alkyd resins are prepared from modified polyols, i.e. the polyols are partially esterified with monobasic acids such as the fatty acids derived from naturally occurring glycerides before reaction with the polybasic acid. The partial esters are prepared in several different procedures, e.g. alcoholysis of glycerides or direct esterification of polyols. For example, natural triglyceride oils such as soya bean oil are reacted with a polyol to effect alcoholysis of the triglyceride, usually until substantially no further triglyceride is present. The resulting mixture is comprised of partial esters of glycerol and the added polyol. Suitable partial esters of polyols may also be prepared by reaction of monocarboxylic acids with various polyols, e.g. hexanediol, pentaerythritol, glycerol, trimethylolpropane and the like. The monobasic acids in general use are derived from naturally occurring oils such as soya bean oil, tall oil and linseed oil, and include oleic and linoleic acids. Shorter chain-length comparable acids are also used. For economic reasons, the partial ester mixture produced by the aforesaid alcoholysis reaction is most widely used.

Desirably, the partial esters on esterification with the selected acid to form the corresponding resin should attain a relatively high viscosity, particularly where the alkyd resin is intended for coating application use, e.g. as in paint. In order to attain the desired high viscosities, usually long reaction times are required ranging from about 5 hours to even longer reaction time. With some polyols, such as trimethylolpropane, the desired viscosities are not easily attainable and often are unattainable under the usual process conditions employed.

It is now found that shorter reaction times and desired high viscosities can be obtained by incorporation of certain multifunctional polyol derivatives into the aforesaid esterification reaction mixture. Other benefits derive from the presence of the multifunctional polyol derivative such as improved color characteristic and, in some cases, faster drying times when formulated and tested as coating compositions. It has also been found that certain polyols which do not give practical reaction times, e.g. up to 18 hours, or more, in the preparation of the alkyd resin, and often do not yield the desired viscosities of the reaction product, do yield the desired viscosities within relatively short reaction times and the resin products show excellent drying times when a multifunctional polyol is incorporated into the alkyd resin in accordance with the present invention. Illustrative of the latter type of polyol is trimethylolpropane which, when used as the polyol in the alcoholysis of a liquid triglyceride, followed by acylation, yields a product of lower viscosity than desired even after the reaction time is extended to eighteen hours under the usual process conditions. However, when employed in accordance with the present invention, trimethylolpropane provides workable viscosities of alkyd resin in short reaction time and practical drying times for coatings made with the alkyd resin product.

The multifunctional polyol derivatives of the present invention are $\alpha, \beta$-ethylenically unsaturated carboxylic acid esters of polyols, the polyols containing at least two hydroxy groups. Exemplary of such acids are acrylic, methacrylic and homologous acids thereof, and the polyols include, for example, ethylene glycol; diethylene glycol; glycerol; 1,3-propanediol; 1,3-butanediol; 1,2,4-butanetriol; 1,4-cyclohexanediol; 1,4-benzenediol; pentaerythritol; dipentaerythritol; tripentaerythritol; trimethylolpropane; trimethylolethane; sorbitol; 1,5-pentanediol; hexanediol; polyethylene glycols (Mol. wt.=200–1500) and the like. The said polyols are also suitable for the aforesaid preparations of the polyol partial ester starting materials.

The acid employed in forming the alkyd resin is usually phthalic or isophthalic acid, although various equivalent acids can be used, e.g. adipic, succinic, pimelic, and other such dibasic acids. Usually unsaturated dibasic acids such as maleic and fumaric acid are avoided since their use can lead to gelation of the alkyd resin preparation mixture.

A variety of oils are suitable for the alcoholysis preparation of the partial esters as is known to the art. The most common are, for example, soya bean oil and linseed oil. Any liquid triglyceride, of course, can be employed but the preferred are usually the naturally occurring liquid triglycerides exemplified by soya bean, and linseed oils. These same oils can be used as the source of the monobasic acids employed in partial esterification of polyols to form polyol partial ester starting materials.

DESCRIPTION OF PREFERRED EMBODIMENTS

The preferred multifunctional polyol derivatives are acrylic acid or methacrylic acid esters of the selected polyol in which at least two hydroxy groups are esterified. Exemplary preferred compounds include: ethylene glycol diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra- acrylate and methacrylate, dipentaerythritol hexacrylate, tripentaerythritol hexacrylate, tripentaerythritol octaacrylate, trimethylolpropane triacrylate, trimethylolethane triacrylate, sorbitol hexacrylate, 1,3-propanediol diacrylate, 1,5-pentanediol dimethacrylate, hexanediol diacrylate, the bisacrylates and methacrylates of polyethylene glycols of a molecular weight of 200–1500, and the like.

The multifunctional polyol derivatives can be employed at any level to attain the desired result. As little as 0.5% by weight based on the weight of the reaction mixture will provide some beneficial results. Generally, from about 1% to about 10% can be employed for most compositions, although larger amounts can be employed. However, when high levels of the derivative are used, care should be taken to avoid gelation of the reaction mixture. A minimum of experimentation will dictate the optimum effective levels of the polyol derivative in any particular alkyd resin preparation and is within the skill of the art. As is evident, the level at which gelation will occur is dependent upon the number of unsaturated acrylic groups contained in the polyol derivative, as well as the process conditions employed in the acylation reaction.

The alcoholysis step of the present new process is carried out by reaction of the selected polyol with the liquid glyceride until the desired degree of alcoholysis occurs. Usually, the mixture of oil and polyol is heated to elevated temperature, e.g. from about 160° to about 240°-250° C. for time periods of from about ½ to about 5 hours after which alcoholysis has proceeded to a substantial extent. It is preferable to continue the alcoholysis until substantially complete, i.e. little, if any, starting glyceride oil is present. The presence of even small amounts of glyceride in the alcoholysis mixture can lead to longer drying times for any coating formulation prepared from the final alkyd resin for which reason substantially complete alcoholysis is preferred. A simple test procedure to determine complete alcoholysis involves addition of samples of the alcoholysis reaction to a solvent for the alcoholysis products which does not dissolve the starting glyceride, e.g. an alcohol such as methanol. For example, when 2½ ml. of methanol is added to 1 ml. of the reaction mixture in ½ ml. increments per minute and the mixture remains clear, i.e. not hazy, this will indicate substantially complete alcoholysis. As can be expected, the reaction temperature and time required for any specific polyolglyceride mixture will vary depending upon the starting materials. Of course, when low reaction temperature is employed, the time of reaction will be longer than with higher reaction temperature.

After the alcoholysis is substantially complete, the phthalic acid, preferably in the form of the anhydride, and the multifunctional polyol derivative are added to the alcoholysis mixture and the mixture heated to form the alkyd resin. The heating is continued until the acid number of the resin is at or near 10 and preferably until the viscosity is relatively high compared to control alkyd preparations. The esterification reaction is conveniently monitored by measuring the water formed during the course of the reaction. When alkyd resin formation starts, water is given off and continues until the reaction is complete. Thus, the reaction mixture is heated to a temperature where water evolution commences and the reaction is followed by merely collecting the water in a suitable trap. Heating is continued until the volume of trapped water remains constant. For most such reactions, temperatures between about 190° and 250° C. are adequate to provide substantially complete reaction.

The reaction time for the final reaction of the phthalic anhydride and alcoholysis mixture is substantially reduced by the presence of the polyol derivative. Usually, the reduction in time required amounts to at least 50%. Thus, where the normal reaction time is about 5 hours, the reaction time is reduced to usually less than 2.5 hours by the presence of the polyol derivative. In this respect, the reaction time is the time required for attainment of an acid number of about 10, and most preferably a viscosity of at least about "T" (Gardner). (at 60% solids).

As hereinbefore mentioned, reaction times of in excess of 12 hours are required when, for example, pentaerythritol is used with Soya bean oil, followed by treatment with phthalic anhydride, before the desired viscosity value is attained. When trimethylolpropane is used in lieu of pentaerythritol, the desired viscosity value is not attainable. However, such reactions proceed to desired viscosities in relatively short reaction times, as few as several hours, when the multifunctional polyol derivatives are present in accordance with the invention.

When the partial ester is formed by direct esterification of a polyol with monobasic acids as soya fatty acids, the reaction can be effected by merely heating the mixture to elevated temperature until the desired degree of esterification occurs. This can be determined by merely trapping and measuring the water given off. Thereafter, the dicarboxylic acid, e.g. phthalic acid, is added and heating is then continued until the acid no. of the product is at about 10. Here too, water is evolved and provides a convenient monitoring tool to follow the progress of the reaction. As an alternative to stepwise formation of the alkyd, the polyols, monocarboxylic acids and dicarboxylic acids can be heated in batch-wise fashion to form the desired alkyd resin. Usually, the reaction temperatures will be in the range of about 170°-250° C. wherein water is evolved.

The amount of phthalic anhydride employed in the alkyd resin formation is that normally employed in preparing such products. Generally, at least about 15% by weight based on the total reaction mixture is employed. Usually, from about 20% to about 30% by weight of anhydride is found to produce desired results. When employing the anhydride at the lower percentage, e.g. up to about 25% by weight, it is preferred to use the multifunctional polyol derivative at higher levels than when the amount of anhydride is on the high side of the operable range, e.g. above 25%. Thus, the amount of polyol derivative is adjusted depending on the level of anhydride employed the higher the anhydride level, the lower the amount of polyol derivative required to obtain the desired results, and vice versa.

The multifunctional polyol derivative can be added before the anhydride, simultaneous with or even after the anhydride addition. Preferably, the polyol derivative and anhydride are added substantially simultaneously.

The exact mechanism by which the present invention functions is not known, particularly in view of the complexity of the alkyd resin system employed. Apparently, the multifunctional compound is incorporated into the complex structure of the alkyd resin. Regardless of the mechanism, the present invention provides significant improvements in alkyd resin production by incorporation of the present multifunctional polyol derivatives into the final product, the improvements residing in the shortened reaction time and more workable viscosities and better color characteristics of the alkyd resin product and rapid drying time for coatings prepared therefrom.

The final alkyd resins are formulated into coating compositions by thinning with the usual solvents commonly employed in known such compositions. For example, the alkyd resin product can be diluted to 60% solids with suitable solvents, e.g. mineral spirits, to which can be added the usual adjuvants such as pigments, e.g. titanium dioxide, aminoplast curing agents, e.g. melamine and urea formaldehyde resins, and drying agents, e.g. cobalt and lead naphthenates or octoates.

When formulated for coating applications, the present new alkyd resins form coatings which set to touch in from 1 to 2 hours and are tack-free in about 5 to 6 hours. The coatings are at least comparable to commercial coating compositions in the usual stability tests.

Films prepared from the present new alkyd compositions show very high initial gloss and high retention of gloss over protracted periods of weather exposure. Films prepared with lower precentage of phthalic anhydride, e.g. up to about 25% by weight, in particular show significantly higher gloss retention than control films containing no multifunctional polyol derivative but otherwise identically prepared. The films are generally comparable to control films in mildew tests.

The following examples further illustrate the present invention.

EXAMPLE 1

A. Alcoholysis

A mixture of soya bean oil, polyol and litharge (lead oxide) is heated to 230° C. for about one hour (when substantially no original oil is present).

B. Alkyd Resin Formation

To the alcoholysis mixture after cooling to below 200° C. is added phthalic anhydride and the selected multifunctional polyol derivative and the mixture heated. At about 200° C., the first amounts of water are collected and heating is continued to a temperature of 245° C. until no further water evolved.

Comparison alkyd resin products are prepared from the following starting materials:

|  | Sample A | Sample B |
| --- | --- | --- |
| Soybean oil | 601 g. | 601 g. |
| Trimethylolpropane | 159 g. | 159 g. |
| Phthalic anhydride | 240 g. | 240 g. |
| Trimethylolpropane triacrylate | — | 100 g. |
| Litharge | 0.228 g. | 0.228 g. |
| Comparison Values |  |  |
| Reaction time (hours) | 5.3 | 2.25 |
| Viscosity (60% solution in mineral spirits) | A | W |
| Color (60% solution in mineral spirits) | 3.0 | 1½ |
| Acid No. (solids) | 9.1 | 11.2 |

Sample A and B are then formulated into identical coating compositions and films (0.001 mil) are drawn down on steel panels and checked for drying characteristics with the following results.

| Drying Time (Hours) | Sample A | Sample B |
| --- | --- | --- |
| Set to Touch | 4 | 2 |
| Tack-free | 24 | 6 |

EXAMPLE 2

Using the procedure described in Example 1, an alkyd resin is prepared from the following starting materials:

| Soya bean oil | 601 g. |
| --- | --- |
| Trimethylolpropane | 159 g. |
| Phthalic anhydride (PA) | 240 g. |
| Trimethylolpropane triacrylate (TMPTA) | 20 g. |
| Litharge | 0.228 g. |

The alkyd resin product (Acid no.=1.1, Viscosity I) on formulation as a coating composition and coated on a steel panel as in Example 1 is tack-free in one hour and dry to touch in 24 hours.

EXAMPLE 3

An alkyd resin is prepared from the following starting materials using the procedure of Example 1:

| Soya bean oil | 601 g. |
| --- | --- |
| Trimethylolpropane | 159 g. |
| PA | 240 g. |
| Pentaerythritol triacrylate (PETA) | 20 g. |
| Litharge | 0.228 g. |

The alkyd resin product (acid no.=4.2, Viscosity R) as a coating composition showed 55 minutes dry to touch and 24 hours tack-free times.

EXAMPLE 4

An alkyd resin is prepared from the following starting materials by the procedure of Example 1:

| Soya bean oil | 601 g. |
| --- | --- |
| Trimethylolpropane | 159 g. |
| PA | 240 g. |
| TMPTA | 50 g. |
| Litharge | 0.228 g. |

The resulting resin product after reaction for 5 hours and 20 minutes shows the following properties when diluted to 60% solids in mineral spirits:

| Color | 2½ |
| --- | --- |
| Acid No. | 7.1 |
| Viscosity | Y |
| As a film: | |
| Set to touch | 50 min. |
| Tack-free | 24 hours |

EXAMPLE 5

An alkyd resin is prepared in accordance with the procedure and starting materials of Example 4, excepting PETA is substituted for TMPTA with the product after reaction for 5 hours having the following characteristics when diluted to 60% solids in mineral spirits:

| Color | 2½ |
| --- | --- |
| Acid No. | 9.1 |
| Viscosity | X |
| As a film: | |
| Set to touch | 1 hour |
| Tack-free | 24 hours |

EXAMPLE 6

Comparison alkyd resins are prepared according to the procedure of Example 1 with the anhydride at higher level than in the previous examples from the following starting materials:

|  | Sample A | Sample B |
| --- | --- | --- |
| Soya bean oil | 547.5 g. | 547.5 g. |
| Trimethylolpropane | 182.5 g. | 182.5 g. |
| PA | 270 g. | 270 g. |
| TMPTA | — | 20 g. |
| Litharge | 0.22 g. | 0.22 g. |

The respective alkyd resins show the following properties:

|  | Sample A | Sample B |
| --- | --- | --- |
| Reaction Time (hours) | 13 | 7 |
| Viscosity | J | V |
| Color | 4½ | 2½ |
| Acid No. | 1.9 | 5.1 |
| As a film: |  |  |
| Set to touch | 50 min. | 55 min. |
| Tack-free | 5 hours | 5 hours |

EXAMPLE 7

The procedure of Example 6 is repeated with the Sample B formula excepting PETA is substituted for TMPTA with the resin product after reaction for 6.5 hours having the following properties:

| Viscosity | X |
| --- | --- |
| Color | 2¾ |
| Acid No. | 4.7 |
| As a film: |  |
| Set to Touch | 55 min. |
| Tack-free | 5 hours |

EXAMPLE 8

The procedure of Example 7 is repeated using PETA at 50 g. level in lieu of the 20 g. level.

The alkyd resin product after reaction for 2 hours and 50 minutes shows the following properties:

| Color | 2 |
| --- | --- |
| Viscosity | Z |
| Acid No. | 11 |
| As a film: |  |
| Set to touch | 1 hours |
| Tack-free | 5 hours |

EXAMPLE 9

An alkyd resin is prepared in accordance with Example 8 excepting TMPTA is used in lieu of PETA. The product after reaction for 3 hours and 50 minutes shows the following properties:

| Color | 2½ |
| --- | --- |
| Viscosity | Z ¾ |
| Acid No. | 9.3 |
| As a film: |  |
| Set to touch | 1 hours |
| Tack-free | 5.5 hours |

EXAMPLE 10

Comparison samples of alkyd resin are prepared in accordance with the procedure of Example 1 with the following starting materials:

|  | Sample A | Sample B |
| --- | --- | --- |
| Soya bean oil | 601 g. | 601 g. |
| Trimethylolpropane | 159 g. | 159 g. |
| PA | 240 g. | 240 g. |
| Litharge | 0.228 g. | 0.228 g. |
| TMPTA | — | 100 g. |

The products showed the following properties:

|  | Sample A | Sample B |
| --- | --- | --- |
| Viscosity | A | W |
| Color | 3 | 1½ |
| Acid No. | 9.1 | 11.2 |
| Reaction Time | 13 hours | 3.5 hours |
| As a film: |  |  |
| Set to touch | 4 hours | 2 hours |
| Tack-free | 24 hours | 6 hours |

EXAMPLE 11

The following starting materials are reacted in accordance with the procedure of Example 1:

| Soya bean oil | 638.2 |
| --- | --- |
| Pentaerythritol | 121.8 |
| PA | 240 |
| TMPTA | 100 |
| Litharge | 0.228 |

After one hour and 25 minutes at 245° C., the mixture became very viscous and gelled.

EXAMPLE 12

Paint formulations are prepared in accordance with the following:

A TiO$_2$ paste is prepared by thoroughly mixing and grinding on a 3 roll mill to a 7-5 fineness titanium dioxide and the selected alkyd resin in mineral spirits (60% solids) in following proportions:

|  | Parts by Weight |
| --- | --- |
| TiO$_2$ | 60 |
| Alkyd resin (60% by weight in mineral spirits) | 40 |

A white air-dry enamel composition is prepared from the TiO$_2$ paste in the following formulation:

|  | Parts by Weight |
| --- | --- |
| TiO$_2$ Paste | 40 |
| Alkyl resin (60% by weight in mineral spirits) | 44 |
| Mineral spirits | 14.95 |
| Lead Salt (24% available lead) | 0.75 |
| Cobalt Salt (6% available cobalt) | 0.30 |

The total solids content is 60% (24% pigment and 36% resin.) Based on the total resin content, the lead content is 0.05% and cobalt, 0.1%.

Paint formulations are made of the resins of the preceding examples and the paint formulations on testing for weathering by exposure for six months at 45° South give the following results:

TABLE

| Alkyd Resin of Example | Initial Gloss | % Gloss Retention | Mildew on Metal | Mildew on Chalked Wood | Mildew on Primed Wood |
|---|---|---|---|---|---|
| 1 (Sample A) | 79.4 | 25 | 2 | 1 | 1 |
| 2 | 92.4 | 68 | 4 | 2 | 3 |
| 3 | 92.4 | 64 | 3 | 3 | 2 |
| 4 | 88.0 | 55 | 3 | 2 | 2 |
| 5 | 90.2 | 52 | 4 | 2 | 3 |
| 6 (Sample A) | 92.6 | 70 | 5 | 3 | 3 |
| 6 (Sample B) | 93.0 | 70 | 4 | 3 | 3 |
| 7 | 88.6 | 72 | 5 | 3 | 3 |
| 8 | 90.2 | 57 | 5 | 3 | 3 |
| 9 | 89.0 | 58 | 4 | 3 | 2 |

For mildew results,
10 = none
1 = fail

A commercial alkyd exterior house paint on identical testing showed an initial gloss of 74.2 and a gloss retention of only 4% after 6 months.

When the foregoing examples are repeated with linseed oil in place of soya bean oil, similar results are obtained.

When the procedures of the preceding examples are repeated with the following multifunctional polyol derivatives, similar results are obtained:
1,6-hexanediol diacrylate
tetraethylene glycol diacrylate
trimethylolpropane trimethacrylate
1,6-hexanediol dimethacrylate Color determinations are carried out using a Gardner Colorimeter (Gardner Laboratory Inc., Bethesda, Md.) and viscosity determinations with a Gardner Viscosimeter (same company).

What is claimed is:

1. An improved alkyd resin comprising the reaction product of:
   (1) a polycarboxylic acid or a polycarboxylic acid anhydride,
   (2) a partial or complete ester of (a) a polyol having at least two hydroxyl groups with (b) a monobasic fatty acid derived from a naturally-occurring glyceride, and
   (3) from 0.5 to 10% by weight, based on the total weight of said reaction product, of an acrylic or methacrylic acid ester of a polyol in which at least two hydroxyl groups are esterified.

2. An improved alkyd resin as described in claim 1 wherein said acrylic acid ester is trimethylolpropane triacrylate.

3. An improved alkyd resin as described in claim 1 wherein said acrylic acid ester is pentaerythritol triacrylate.

4. An improved alkyd resin as described in claim 1 wherein the polyol used to prepare said partial or complete ester is trimethylolpropane and said polycarboxylic acid anhydride is phthalic anhydride.

5. An improved alkyd resin as described in claim 1 wherein the polyol used to prepare said partial or complete ester is pentaerythritol and said polycarboxylic acid anhydride is phthalic anhydride.

6. An improved alkyd resin as described in claim 1 wherein said partial or complete ester comprises the alcoholysis product of a polyol having at least two hydroxyl groups with a triglyceride oil, and the amount of said acrylic or methacrylic ester used ranges from about 1% to about 10% by weight, based on the total weight of said reaction product.

7. An improved alkyd resin as described in claim 6 wherein said alcoholysis product is the alcoholysis product of soya bean oil and trimethylolpropane.

8. An improved alkyd resin as described in claim 6 wherein said alcoholysis product is the alcoholysis product of soya bean oil and pentaerythritol.

9. A process for preparing an improved alkyd resin which comprises reacting
   (1) a polycarboxylic acid or a polycarboxylic acid anhydride,
   (2) a partial or complete ester of (a) a polyol having at least two hydroxyl groups with (b) a monobasic fatty acid derived from a naturally-occurring glyceride, and
   (3) from 0.5 to 10% by weight, based on the total weight of the reaction product, of an acrylic or methacrylic acid ester of a polyol in which at least two hydroxyl groups are esterified.

* * * * *